United States Patent [19]

Freed

[11] Patent Number: 5,208,083

[45] Date of Patent: May 4, 1993

[54] POLYMER BLENDS WITH ENHANCED PROPERTIES

[75] Inventor: William T. Freed, Stockton, N.J.

[73] Assignee: Rohm and Haas Company, Philadelphia, Pa.

[21] Appl. No.: 843,784

[22] Filed: Feb. 28, 1992

Related U.S. Application Data

[62] Division of Ser. No. 438,371, Nov. 16, 1989, Pat. No. 5,147,930.

[51] Int. Cl.⁵ .................... B32B 27/08; B32B 27/32
[52] U.S. Cl. ................... 428/36.7; 53/476; 428/36.91; 525/56; 525/57; 525/217
[58] Field of Search ............ 428/36.7, 36.91

[56] References Cited

U.S. PATENT DOCUMENTS

| | | |
|---|---|---|
| 2,509,857 | 5/1950 | Borcherdt et al. . |
| 2,557,266 | 6/1951 | Dittmar et al. . |
| 4,003,963 | 1/1977 | Creasy et al. . |
| 4,246,374 | 1/1981 | Kopchik . |
| 4,284,671 | 8/1981 | Cancio et al. . |
| 4,362,844 | 12/1982 | Lemstra et al. . |
| 4,410,482 | 10/1983 | Subramanian . |
| 4,427,825 | 1/1984 | Degrassi et al. . |
| 4,650,824 | 5/1975 | Clikeman et al. . |
| 4,727,117 | 2/1988 | Hallden-Abberton et al. . |
| 4,877,662 | 10/1989 | Yazaki et al. . |

FOREIGN PATENT DOCUMENTS

| | | |
|---|---|---|
| 238197 | 9/1987 | European Pat. Off. . |
| 273897 | 7/1988 | European Pat. Off. . |
| 1482058 | 5/1974 | United Kingdom . |

OTHER PUBLICATIONS

Polym Eng Sci, vol. 24, No. 2, p. 153 "Analysis of Transient Sorption and Permeation . . . " 1984.
Polym Eng Sci, 25,483 (1985) "Permeability Barriers by Controlled Morphology of Polymer Blends".
Research Disclosure, Oct. 1988, pp. 726-733.

*Primary Examiner*—Jacob Ziegler
*Attorney, Agent, or Firm*—Darryl P. Frickey

[57] ABSTRACT

Polymer blends of a) polymers containing predominantly mers of (meth)acrylates and/or glutarimides with b) up to about 40 weight percent of polymers having greater than about 50 mol % vinyl alcohol mers exhibit useful barrier properties to oxygen and other environmental gases, while maintaining or enhancing physical properties and clarity.

5 Claims, No Drawings

5,208,083

POLYMER BLENDS WITH ENHANCED PROPERTIES

This is a divisional of application Ser. No. 438,371, filed Nov. 16, 1989, now U.S. Pat. No. 5,147,930.

FIELD OF THE INVENTION

This invention relates to polymer blends of (meth)acrylate polymers, or glutarimides derived from such polymers, with polymers containing vinyl alcohol mers which are either miscible with, or form a discontinuous phase in, the poly(lower alkyl (meth)acrylate), glutarimide polymer, or other polymers which may be present. It further relates to such blends in the form of film, sheet, bottles, or other packaging articles.

BACKGROUND OF THE INVENTION

The packaging industry has long sought to develop plastic film, sheet, bottles, wrappings, and containers which are impervious to oxygen for preserving oxidizable materials and oxygen-sensitive foods and beverages. That industry has further sought to develop similar materials resistant to the passage of carbon dioxide for use in maintaining the carbonation of carbonated beverages. Resistance to passage of water vapor is also important to the packaging industry. No organic polymeric materials are truly impervious to gases; they all show some degree of permeability. Those which have low permeability to a particular gas are considered to be good barriers for that gas, while those which have high permeability are considered to be non-barrier materials with respect to that particular gas. The most useful polymers which exhibit very low values for oxygen permeability, i.e., are good barriers to oxygen, are poly(vinylidene chloride) and polymers containing vinyl alcohol mers, such as ethylene-vinyl alcohol copolymers containing less than about 50 mol percent ethylene units, or the homopolymers of hydrolyzed poly(vinyl acetate) known as poly(vinyl alcohol)s.

Although each of these types of polymers is utilized in commerce, they have deficiencies which limit their broader use. Poly(vinylidene chloride) is thermally less stable than most polymers and is difficult to process; poly(vinyl alcohol)s are difficult to process, and their barrier properties are greatly affected by high relative humidity, and the ethylene-vinyl alcohol polymers, which are more easily processed than poly(vinyl alcohols not containing ethylene, are also sensitive to moisture, and are not optically clear. Further, the structural properties required for many applications are difficult to achieve with these polymers.

The packaging industry has also sought to prepare containers exhibiting enhanced service temperature for the hot-fill packaging of foods, sterilization prior to packaging, autoclaving to sterilize contents, and the like. Materials attractive for such heat-sensitive uses tend to have poor barrier properties.

Polymers based on lower alkyl methacrylates, such as poly(methyl methacrylate) exhibit clarity, have some degree of toughness, and can be compounded with impact modifiers to improve toughness, but do not exhibit satisfactory barrier properties. Conversion by reaction with lower alkyl amines or ammonia to polymers with mers of glutarimide improves the barrier properties significantly, but they still do not meet the requirements of the most demanding barrier applications. Kopchik, U.S. Pat. No. 4,246,374, discloses such polymers in thermally stable form, and discloses that their barrier properties are superior to most clear thermoplastics.

Hallden-Abberton et al., in U.S. Pat. No. 4,727,117, describe a means of reducing the content of unreacted acid and anhydride groups of glutarimide polymers to prepare novel polymers of even higher thermal stability. In that patent, an extensive list of polymers with which such acid-content reduced glutarimides may be blended is given. Among these polymers are listed ethylene-vinyl acetate polymers and polyvinyl alcohol. Ethylene-vinyl alcohol polymers have not been disclosed for this use, and there is no suggestion in the prior art that the permeability behavior of such blends would differ in any way from an expected average performance, nor that the resulting blend would be particularly useful in barrier packaging applications. There is further no suggestion that blends of a second polymer with the acid-reduced polyglutarimides could be admixed with the polymers containing vinyl alcohol mers to obtain the barrier properties of the present invention.

Blends of ethylene-vinyl alcohol polymers with vinyl alcohol contents greater than about 50 mol percent have been noted in the patent literature as components of blends with certain matrix polymers, such blends having attractive barrier properties. Particularly noted as matrices are poly(vinyl chloride) in U.S. Pat. No. 4,003,963, poly(ethylene terephthalate) in U.S. Pat. No. 4,284,671, and polypropylene in U.S. Pat. No. 4,362,844. These patents do not suggest the use of ethylene-vinyl alcohol copolymers with acrylic or glutarimide polymers for such purposes, nor do they disclose unexpected improvement in barrier properties at low levels of the ethylene-vinyl alcohol copolymer in the blend.

Particularly noted is the intensive study of polyamide blends with ethylene-vinyl alcohol resins. U.S. Pat. No. 4,427,825 teaches such blends, wherein there are regions of the ethylene-vinyl alcohol copolymer having an average diameter of less than 50 nanometers in the polyamide. These compositions, as do those of the blends noted in the previous paragraph, exhibit a linear relationship for permeability behavior which is expected for such blends and which is demonstrated by a straight-line plot when the permeability is plotted as the ordinate on semi-logarithmic paper with ethylene-vinyl alcohol content as the abscissa.

One known exception to this additive relationship of the linear logarithm of permeability is the disclosure in U.S. Pat. No. 4,410,482 of blends of a polyolefin matrix and a modified or dispersed nylon polymer, in which the nylon is processed to form laminar domains in the matrix. Such blends exhibit barrier properties against hydrocarbon liquids and gases substantially improved over that predicted for a homogeneous blend. Processes are also taught for the incorporation into the polyolefin matrix of dispersed similar platelets of other polymers, such as polycarbonate and poly(butylene terephthalate). This patent does not teach or suggest the utility of ethylene-vinyl alcohol to form laminar structures in poly(glutarimides); indeed, it requires a solvent or a dispersant polymer to obtain the laminar structures, whereas the present invention achieves the desired structure by a conventional thermal/mechanical history of mixing. This patent also does not teach or suggest that the combination of ethylene-vinyl alcohol or poly(vinyl alcohol) polymers within a polyglutarimide matrix will produce unexpectedly good resistance to the passage of gases. Further, the platelet or laminar morphology shown by this patent does not necessarily correspond with the morphology of the present blends; in some examples of improved barrier properties exemplified herein, the vinyl alcohol (co)polymer is finely dispersed in very small particles uniformly throughout the glutarimide matrix, and in others, the vinyl alcohol (co)polymer blend with the glutarimide or poly(lower alkyl) methacrylate matrix polymer shows optical clarity, a single glass-transition temperature, and/or other indicators of blend compatibility. Certain blends at relatively high levels of certain ethylene-vinyl alcohol copolymers do produce a laminar structure with excellent barrier performance.

European Patent Application No. 273,897 discloses blends of polyethylene terephthalate with styrene-maleic anhydride as blow-molded containers having an oriented crystalline continuous phase of polyethylene terephthalate containing dispersed ovoid particles of the styrene copolymer, the ovoids having a diameter of 0.1 to 0.8 μm and a length of 0.3 to 2 μm. The microstructure is reported to impart physical properties suitable for containment or protection against permeation of gases or organic fuels.

A publication in *Research Disclosure*, October, 1988, page 726, discusses the barrier properties of blends of poly(ethylene naphthalene carboxylate) with relatively low levels of ethylene-vinyl alcohol copolymers. This publication states that the actual values for oxygen permeability in such blends are four to five times lower than predicted from calculations of the effective permeability of the ethylene-vinyl alcohol copolymer from PET data. These data, while not calculated against a pure ethylene-vinyl alcohol polymer standard and thus not directly comparable with the data of the present invention, do show an unexpected improvement in a manner also demonstrated herein. The composite materials of the reference are opaque; the domains which are necessary to lower the oxygen permeability must be large enough to eliminate the clarity of the blends and thus destroy one of the particularly useful properties of the matrix polymers.

It is thus an object of the present invention to prepare a blend of polymers having outstanding barrier properties to oxygen, carbon dioxide and moisture from one or more polymers having certain desirable physical properties but inadequate gas barrier properties of their own, and a polymer with vinyl alcohol mers which has excellent barrier properties. Another object is to prepare such a barrier blend structure further having excellent optical properties, resistance to impact, a service temperature sufficient for hot-fill and sterilization, and/or other desirable physical properties. Further objects and advantages will be apparent from the following description of the present invention.

SUMMARY OF THE INVENTION

We have discovered polymer blends comprising from about 20 to about 95% by weight of a first polymer containing at least 50 mole percent mers of one or more of lower alkyl (meth)acrylates and glutarimides and forming a continuous phase, from about 2.5% to about 40% by weight of a second polymer having at least 50 mole percent vinyl alcohol mers which is either miscible with, or forms a discontinuous phase in, the continuous phase, and up to about 75% by weight of one or more additional thermoplastic polymers compatible with the continuous phase. These blends have good barrier properties to gases, and other useful physical and optical properties. We have further discovered a process for improving the gas-barrier properties of polymers containing at least 50 mole percent mers of lower alkyl (meth)acrylate, glutarimide or a mixture of the two, which polymers may have only moderate gas barrier properties themselves, which comprises blending these polymers with the second polymer having at least 50 mol percent vinyl alcohol mers. The polymer blends may be formed into a film, sheet, molded article, container or packaging material.

DETAILED DESCRIPTION OF THE INVENTION

The term "mer" as used herein means a combination of elements which, when polymerized by addition polymerization, forms a single repeating unit in a polymer. Thus the monomer ethylene ($CH_2=CH_2$) becomes the mer ethylene ($-CH_2-CH_2-$) in polyethylene, even though the ethylenic double bond is no longer present in the polymer. The mer may be hypothetical, as in a vinyl alcohol mer present in hydrolyzed poly(vinyl acetate). More than one mer is present in a copolymer. Mers may be formed by post-reaction on a polymer, such as in a N-methyl dimethylglutarimide mer formed by the addition of methylamine to two neighboring mers of methyl methacrylate accompanied by the loss of two molecules of methanol.

The term (meth)acrylate, as used herein refers to an acrylate ester, a methacrylate ester, a mixture of the two, or mers of an acrylate ester, a methacrylate ester or a mixture of the two. Similarly, (meth)acrylamide refers to acrylamide, methacrylamide, a mixture of the two, or mers of acrylamide, methacrylamide or a mixture of the two.

In the present specification, the term "glutarimide" or "glutarimide polymer" refers broadly to polymers containing the cyclic group or mer of formula I,

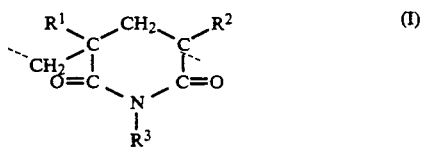

where $R^1$ and $R^2$ may be H or lower alkyl, preferably both $R^1$ and $R^2$ being methyl, and $R^3$ is hydrogen, alkyl, aryl, alkaryl, or aralkyl. The term "lower alkyl", as used herein, means alkyl groups having from one to six carbon atoms, such as methyl, ethyl, n-propyl, sec-propyl, n-butyl, isobutyl, pentyl, hexyl, cyclohexyl and the like. Substituents may be present on the $R^3$ groups, such as hydroxy, halogen, such as chlorine or fluorine, and the like. Preferably, $R^3$ is lower alkyl of from one to four carbon atoms, and more preferably methyl. The glutarimide group may be the sole repeating unit or mer in the polymer, or the polymer may contain other mers, preferably those of an alkyl (meth)acrylate, and more preferably methyl methacrylate. Other mers, such as those from styrene, α-methylstyrene, vinyl chloride, (meth)acrylic acid, (meth)acrylic anhydride, (meth)acrylamides, such as (meth)acrylamide, N-methyl (meth)acrylamide, N,N-dimethyl (meth)acrylamide, and the like, other (meth)acrylic esters, (meth)acrylonitrile, N-substituted maleimides where the substituted group is $R^3$, and the like may also be present. While the glutarimide polymer may contain smaller proportions of glutarimide mers and still be within the invention as contemplated, a preferred glutarimide polymer contains at least about 50% mers of glutarimide, and a more preferred glutarimide polymer contains at least about 80% mers of glutarimide.

The glutarimide polymer may be prepared by any of the methods known to those skilled in the art, such as by the reaction at elevated temperature of (meth)acrylic ester polymers or (meth)acrylic acid-(meth)acrylic ester copolymers with ammonia, an amine, urea, or a substituted urea, by reaction of poly(meth)acrylic anhydride) with ammonia or an amine, by thermal reaction of a (meth)acrylic ester-(meth)acrylamide copolymer to form the imide ring, or by reaction in solution or in the melt of a polymer containing a high proportion of (meth)acrylic ester groups with ammonia or an amine. Preferred glutarimides are prepared by the method taught in U.S. Pat. No. 4,246,374, in which a (meth)acrylic-ester-containing polymer is reacted with an amine at elevated temperatures in a devolatilizing extruder. The glutarimide polymer may be of weight-average molecular weight from about 10,000 to about 10,000,000. A preferred molecular-weight range for retention of properties and ease of processing is from about 50,000 to about 200,000.

Polymers containing mers of formula I which have limited thermal stability resulting from the presence of relatively large amounts of acid, anhydride or other de-stabilizing components may be used in the present invention, but they will be less desirable because of deficiencies in processing and use.

The poly(glutarimide) may be further post-treated to reduce or remove acid and/or anhydride groups by treating it with reagents that eliminate such groups, such as, for example, dimethyl carbonate; these reduced-acid polymers are preferred, but polyglutarimides containing acids and/or anhydrides are also useful in the present invention.

Also useful in the present invention as the first polymer are polymers containing at least about 50 mole percent of mers of a lower alkyl(meth)acrylate, preferably methyl methacrylate, but including mers such as methyl acrylate, ethyl acrylate or methacrylate, butyl acrylate or methacrylate, hexyl methacrylate or methacrylate, cyclohexyl acrylate or methacrylate, and the like. The first polymer may also include mers of such monomers as substituted alkyl acrylates and methacrylates, such as β-hydroxyethyl methacrylate, β-hydroxypropyl acrylate, and the like, vinyl heterocyclic monomers, such as 4-vinylpyridine, 2-vinylpyridine, N-vinylpyrrolidone, N-vinylimidazole, 2-vinylthiophene and the like, unsaturated carboxylic acids, such as methacrylic acid, acrylic acid, acryloxypropionic acid, and the like, vinyl aromatic monomers, such as α-methylstyrene, styrene, p-hydroxystyrene, and the like, maleic anhydride, maleimide, N-alkyl maleimides, N-aryl maleimides, vinyl acetate, acrylonitrile, and other vinyl, vinylidene or maleic monomers. Preferred are polymers with at least 80 mol % (meth)acrylate mers. Especially preferred are polymers containing at least 90% (meth)acrylate mers. As used herein with respect to mers, the terms "a preponderance" and "predominantly" are used to mean a mol percentage greater than 50%.

The lower alkyl (meth)acrylate polymer useful for preparing the glutarimide, for incorporating (meth)acrylate mers into the glutarimide-containing polymer, and as the first polymer containing at least about 50 mole percent of lower alkyl (meth)acrylate mers, may be prepared, using various ionic or free-radical methods, to a weight-average molecular weight from about 10,000 to about 10,000,000. A preferred range for retention of properties and ease of processing is from about 50,000 to about 200,000. A preferred process for manufacture uses a continuous-flow, stirred-tank reactor, but other polymerization processes which will be readily apparent to those skilled in the art, including suspension, bulk, or emulsion may be employed. The polymer may contain stabilizers, such as against ultraviolet light or heat degradation, and other additives such as processing aids, dyes and the like which are well known to those skilled in the art.

Another preferred embodiment of the first polymer is a copolymer of methyl methacrylate with up to about 30 mole percent, and more preferably from about 20 to about 30 mole percent, of one or more of styrene, α-methylstyrene, p-hydroxystyrene, (meth)acrylic acid, (meth)acrylic anhydride, (meth)acrylamide, maleic anhydride, maleimide, cyclohexyl (meth)acrylate, N-alkylmaleimides, N-arylmaleimides, 4-vinylpyridine, or N-vinylpyrrolidone.

A polymer containing at least 60% of mers of the glutarimide of formula I where $R^1=R^2=R^3=$methyl is one preferred embodiment of the first polymer. Such a polymer, either acid-reduced or non-acid reduced, will exhibit a Vicat softening temperature greater than about 140° C.

The second polymer containing at least about 50 mole percent vinyl alcohol mers is preferably a poly(vinyl alcohol), an ethylenevinyl alcohol copolymer, or a copolymer of vinyl alcohol mers with long-chain alkenoxy methacrylate mers. The poly(vinyl alcohols) may be made by hydrolysis of poly(vinyl acetate), and can be obtained commercially with varying degrees of hydrolysis. The resulting polymers are copolymers containing mers of vinyl alcohol and vinyl acetate. The preferred poly(vinyl alcohols) contain at least about 80 mole percent mers of vinyl alcohol. The preferred alkenoxy methacrylate mers are those which terminate in hydrogen, $C_1-C_{20}$ alkyl, $C_6$ aryl or $C_7-C_{30}$ alkaryl groups.

Because polymers of vinyl acetate which have been extensively or completely hydrolyzed to poly(vinyl alcohol) are quite sensitive to water and exhibit barrier properties influenced by the equilibrium moisture content, it is preferred in the present invention, as it is generally in the known art of barrier resins, to utilize copolymers wherein the vinyl alcohol group is present along with some less hydrophilic mers. Such mers may be (meth)acrylic esters, olefins, and the like, and mers of styrene and substituted styrenes grafted to the polymer. Preferred because of ease of synthesis and control of the extent of vinyl alcohol mers are hydrolyzed copolymers of ethylene. The ethylene-vinyl alcohol copolymers may be made by hydrolysis of an ethylene-vinyl acetate copolymer, or can be obtained commercially. They contain from about 15 to about 50 mole percent ethylene mers, and more preferably from about 25 to about 50 mole percent ethylene mers, at least about 50 mole percent vinyl alcohol mers, and may contain additional vinyl mers, as for example residual vinyl acetate mers.

The second polymer may be present at amounts up to about 40% by weight of the blend, more preferably from about 5% to about 40% by weight, and still more preferably from about 5% to about 35% by weight. At levels below about 5% the enhanced barrier properties are difficult to discern, and above about 40% the undesirable physical properties of the vinyl alcohol polymer may degrade the physical properties of the blend.

The blend of glutarimide or (meth)acrylate first polymer and second polymer containing at least 50 mole percent vinyl alcohol mers may further contain one or more other thermoplastic polymers with which the first polymer is known to be compatible, to form a multipolymer blend. The other thermoplastic polymers include polymers such as butadiene/styrene/(meth)acrylic, styrene/(meth)acrylic, and (meth)acrylic multistage polymers (as used herein"-" indicates blended polymers, "/" statistical or random copolymers, and "//" graft or block polymers); butadiene/styrene rubbers, ethylene/propylene/diene rubbers, polyamides, polyamide-multistage polymer blends (as used herein the multi-stage polymer may be a rubber grafted with a compatibilizing polymer and useful, for example, for imparting improved impact resistance to polymers), ethylene/vinyl acetate, styrene/acrylonitrile, styrene/acrylonitrile-multistage polymer blends, styrene/acrylonitrile-ethylene/propylene/diene rubber blends, α-methylstyrene/acrylonitrile, α-methylstyrene/styrene/acrylonitrile, α-methylstyrene/methyl methacrylate/ethyl acrylate, butadiene//acrylonitrile/styrene, polycarbonate, polycarbonate-multistage polymer blends, polybutylene terephthalate, polybutylene terephthalate-polycarbonate blends, polybutylene terephthalate-multistage polymer blends, polybutylene terephthalate/polytetrahydrofuran, polyvinyl chloride, polyvinyl chloride-multistage polymer blends, polyvinyl chloride-(meth)acrylate blends, chlorinated polyvinyl chloride, acrylonitrile/(meth)acrylate/styrene, epichlorohydrin/bisphenol-A, polyethylene terephthalate or other polyalkylene terephthalate, polyethylene terephthalate-glycol modified, polyethylene terephthalateacid modified, polyethylene terephthalate-polycarbonate blends, polycaprolactone, polyarylate, copolyester of bisphenol-A with isophthalic and/or terephthalic acids, poly(meth)acrylates, polyacetal, polystyrene, poly(p-hydroxystyrene), high-impact polystyrene, styrene/maleic anhydride, styrene/maleimide, polyolefins, polyvinylidene fluoride, polyvinylidene fluoride-multistage polymer blends, cellulosics, polyethylene oxide, polyamideimide, polyetherester, polyetheresteramide and polyetheramide. The amount of blended other polymers may be up to about 75% by weight of the total multi-polymer blend; above that level the improved barrier properties may be seriously degraded, and below about 5% little effect is seen. A preferred range for the blended other polymers is from about 5 to about 50% by weight, and more preferred is from about 5 to about 30% by weight of the total multipolymer blend. The blended other polymers may have moderately good barrier properties, such as poly(ethylene terephthalate) or poly(p-hydroxystyrene), or may be relatively poor in barrier properties, such as polycarbonate. The blended other polymers may chemically combine with the first polymer, as occurs under certain melt conditions with polymers of caprolactam and poly(N-methyl)dimethylglutarimide containing residual acid and anhydride groups.

In most cases the blended other polymers may exhibit good, but not unexpectedly good, barrier performance when blended only with the second polymer containing at least about 50 mole percent vinyl alcohol mers. At levels of the blended other polymers above 75%, the blend may lose the beneficial effects on barrier properties contributed by the binary blend of acrylic or glutarimide polymer with the polymer having vinyl alcohol mers, while below about 5%, the blended other polymers contribute little useful in non-barrier, physical properties, such as toughness, reinforcement, and the like.

Thus, multi-polymer blends of the present invention preferably contain from about 20 to about 95% by weight of (A) the first polymer containing at least about 50 mole percent of mers of one or both of lower alkyl (meth)acrylate and N(lower-alkyl)glutarimide and forming a continuous phase, from about 2.5 to about 40% by weight of (B) the second polymer containing at least about 50 mole percent of vinyl alcohol mers and miscible with, or forming a discontinuous phase in, the continuous phase, and up to about 75% by weight of (C) the blended other polymers. A more preferred blend is from about 30 to about 95% of (A), from about 5 to about 40% of (B), and up to about 30% of (C), and a still more preferred blend is from about 40 to about 70% by weight of (A), from about 10 to about 20% by weight of (B), and from about 20 to about 30% by weight of (C).

Preferred multi-polymer blends are those containing the following polymers as components (A), (B) and (C): (A) poly(methyl methacrylate) (PMMA)-(B) ethylene/vinyl alcohol-(C) poly(p-hydroxystyrene); (A) copolymer (80% methyl methacrylate/20% cyclohexyl methacrylate)-(B) ethylene/vinyl alcohol-(C) polycarbonate; (A) poly(N-methyldimethylglutarimide-(B) ethylene/vinyl alcohol-(C) poly(caprolactam); and (A) poly(N-methyldimethylglutarimide-(B) ethylene/vinyl alcohol-(C) poly(ethylene terephthalate).

The poly(glutarimide) or poly(meth)acrylate may contain additives, such as lubricants, ultraviolet stabilizers, antioxidants, thermal stabilizers, and the like. It may also contain low levels of inorganic fillers and/or fibers, such as mica, glass fibers, and the like.

The blend may be stabilized against interaction, e.g. transesterification and the like, between the alcohol groups of the poly(vinyl alcohol) polymer and the imide or ester groups of the glutarimide polymer; such stabilizers may be present in amounts from about 0.1% to about 2%. Preferred as stabilizers are phosphite or phosphinate esters, such as tris(nonylphenyl) phosphite at levels from about 0.1 to about 0.25 parts per 100 parts of total polymer.

Other polymeric additives such as processing aids, fillers, lubricants, flame retardants, dyes, impact modifiers, surface altering agents, and the like may be present in the glutarimide or (meth)acrylate polymer blend. Such impact modifiers may include core/shell modifiers, such as those commonly called MBS modifiers, acrylate rubber//methacrylate outer stage, acrylate rubber//styrene/acrylonitrile outer stage, and the like.

An especially useful blend of the present invention containing the impact modifiers is a blend of the first polymer, the second polymer, and impact-modified poly(vinyl chloride); this blend is tough, and exhibits barrier properties improved over the impact-modified PVC blend and a service temperature sufficient for hot-fill applications.

Because the glutarimide polymers are relatively resistant to gas permeation, addition of other polymers, either as blends into the matrix or as impact modifiers, may lower the resistance to oxygen and moisture, and more of the other polymer containing vinyl alcohol mers may be required to achieve the desired balance of barrier and other properties.

Without wishing to be bound by theory, in the binary blends the polymer containing vinyl alcohol mers may be dispersed in relatively fine particles, in laminar form, or even in such a fine dispersion that the blend acts like a compatible mixture, i.e., it exhibits a single glass-transition temperature. In many of the examples below, the dispersion of the ethylene/vinyl alcohol copolymer in the glutarimide continuous phase results in a fine and relatively uniform dispersion of the polymer with vinyl alcohol mers, with particle size averaging below 50–100 nm, which is difficult to distinguish from a miscible blend. There is little or no laminar structure noted. In other examples, ethylene/vinyl alcohol polymer of higher ethylene content (44% versus 32%) produces a laminar structure in the glutarimide continuous phase; the barrier properties are comparable to those of the non-laminar blend. Thus, no specific morphology of the polymer causes the improvement in barrier properties, except that the polymer containing vinyl alcohol mers cannot be the continuous phase; when it is, the physical properties of the resulting blend are degraded, and the gas-barrier properties become sensitive to the presence of moisture.

Some end uses require good clarity. This can be obtained by methods known in the art, i.e., by matching the refractive index of the matrix polymer or matrix polymers to that of the vinyl alcohol copolymer. This match must occur within the limits set forth herein for component-polymer levels, nature of the continuous phase, and compatibility of the polymers comprising the matrix blend. In other cases, particularly with multi-componenet blends containing reactive other polymers such as polyamides (nylons), clarity is observed where one skilled in the art would expect hazy or translucent blends.

Many of the blends of the first polymer containing mers of (meth)acrylate or glutarimide with the second polymer containing at least 50 mol percent vinyl alcohol mers exhibit surprisingly good gasbarrier properties when compared with the barrier properties of the first polymer alone, or when compared with the expected improvement in barrier properties that should result from incorporating a relatively small amount of the polymer containing the vinyl alcohol mers. The improvement in gas-barrier properties of the first polymer is not a linear function of the amount of the second, vinyl-alcohol-containing polymer added, but instead increases sharply with the addition of only a small amount of second polymer, and shows little additional improvement at levels of second polymer beyond 40% by weight. As little as 10% by weight, and preferably from about 10 to about 40% by weight, of second polymer blended with the first polymer may produce a blend having oxygen permeability reduced by approximately an order of magnitude or more when compared to those of the first polymer alone.

In the data reported herein, the theoretical or calculated permeability is based on what is essentially an averaging effect. This is the expected behavior for compatible or well-dispersed mixtures, and is represented by a straight-line plot of the natural logarithm of permeability versus concentration of the blend components. Where the dispersion is poor, another response to varying the concentration of the polymer having better barrier properties may occur: the S-shaped curve. In this case the barrier properties remain essentially those of the poorer barrier continuous phase as the concentration of the second phase is increased, until a concentration of the second phase is reached where phase inversion occurs, and the second phase undergoes a transition to the continuous phase as the poorer barrier polymer becomes the discontinuous phase. Through that transition, the barrier properties rapidly improve until they are essentially those of the second polymer, which has now become the continuous phase.

Although the specific polymer combinations of the present invention exhibit essentially an S-shaped curve as the blend composition is varied, the marked improvement in barrier properties occurs in the absence of phase inversion, and at an unexpectedly low level of the second (good) barrier component.

Blending conditions are not thought to be critical, so long as temperatures which cause significant loss of hydroxyl functionality from the vinyl alcohol mers, through either intra- or intermolecular reactions, are avoided. A reasonable range of processing temperatures is from about 200° C. to about 260° C.; below this range the mixture is highly viscous and thus difficult to process, while above this range the polymer tends to thermally degrade at an excessive rate, and discoloration or bubbles may occur in the polymer if it is held at temperatures above this range for extended periods. A temperature range of from about 230° to about 240° C. is preferred for the polyglutarimides.

The polymers may be admixed and blended in a number of ways known to the polymer processing art. The polymers, along with any desired adjuvants and/or other polymers to be combined, may be mixed on a heated mill roll or other compounding equipment, and the mixture cooled, granulated and extruded into film. The polymers may be admixed in extruders, such as single-screw or double-screw extruders, compounded and extruded into pellets which may be then re-fabricated. The extruder may also be used to extrude the blend as pipe, sheet, film, or profile. Pelletized or granulated polymer may be injection or compression molded into sheet, film, or shaped articles.

Thorough mixing and dispersion of the additive polymer is important, but otherwise processing conditions are similar to those of the unmodified matrix polymer and may be readily determined by appropriate experimentation and adjustment of processing conditions by one familiar with processing of the unmodified polymers.

Films or sheets may be uniaxially or biaxially oriented either during extrusion or after such processing, by reheating and stretching.

The polymer granules may be injection molded or extruded into appropriate parisons which are then treated by conventional molding and blowing techniques into bottles or other containers, which containers may be stretch oriented uniaxially or biaxially, or may be left unoriented. It is known in the art for such containers to have closures that allow them to be sealed or capped.

Film or sheet may be treated with additives after forming, such as appropriate heat-seal adhesives, coatings for ink adhesions, printing, labels, and the like.

Films or sheets of the blends of the present invention may be utilized in co-laminar structures, such as multi-layered films, co-extrusion into bottles, and the like. In such operations, the blends have excellent adhesion to a variety of substrates, and separate adhesive layers, or "tie layers", are generally not required, although they may be used. The other polymer of the co-laminate may have specialized barrier properties, such as poly(vinylidene chloride) imparts. Preferred is a co-laminate which is tough or inexpensive, such as nylon, impact-modified nylon, poly(vinyl chloride), polycarbonate, poly(ethylene terephthalate), or a polyolefin such as polypropylene. Such co-laminar structure may involve more than one species of co-laminate and may also involve more than one layer of the blend polymer. The total number of layers is limited only by the capability of the equipment used to produce the multi-layer film or sheet.

The films or sheets, as either monolithic or composite structures, and including articles formed from the films or sheets, may be biaxially oriented, uniaxially oriented or unoriented.

The uses to which the gas-barrier polymers of the present invention may be put are many. Films or wrappings may be used in the packaging of many foodstuffs, such as meat, snacks, boil-in-the-bag items such as frozen vegetables, and the like. Containers suitable for the packaging of carbonated or oxygen-sensitive beverages, such as colas, ginger ale, fruit juice, and the like, may be prepared. Containers suitable for hot-fill or sterilization may be molded from suitable injection-molded or extruded parisons.

Such containers or bottles may be used for packaging of condiments, ketchup, maple syrup, and the like. They may also be used for heat-sterilized containers, such as for intravenously administered fluids, serum vials, medical specimen vials and the like, and to package oxygen-sensitive chemicals.

Other uses for transparent barrier compositions include protecting fragile artifacts, such as books and archaeological specimens, from oxidation while permitting them to be viewed readily. They may provide protective coatings for easily oxidized metals or oxygen-sensitive conductive polymers, as for example in solar-energy collection devices. They may also be used in devices where a specific concentration of gases must be maintained, such as so-called high-temperature metal oxide superconductors, which must be maintained in an oxidizing atmosphere, and controlled-atmosphere chambers used for handling sensitive chemical and biological materials, i.e. "dry boxes" and the like.

The following examples are intended to illustrate the present invention and not to limit it except as it is limited by the claims. All percentages are by weight unless otherwise specified and all reagents are of good commercial quality unless otherwise specified.

The resins used in the following examples are described below:

Polyglutarimide as used in the following examples refers to polymers made by reacting poly(alkyl methacrylate) homo- or copolymers with amines or ammonia at elevated temperatures in a devolatilizing extruder. Poly(N-methylglutarimide) (PMG) refers to a commercial polymer made from poly(methyl methacrylate) and methyl amine. Acid-content-reduced poly(N-methylglutarimide) refers to a similar polymer further reacted with agents that eliminate acid and/or anhydride groups, as for example dimethyl carbonate, as taught in U.S. Pat. No. 4,727,117. In both cases, the Vicat softening temperature was related to the degree of imidization.

Poly(methyl methacrylate) (PMMA) in these examples refers to polymers with a preponderance of methyl methacrylate mers, and particularly those with greater than 85% methyl methacrylate mers, with the other mers being lower alkyl esters of acrylic or methacrylic acid. PMMA homopolymer refers to a polymer with mers at least about 99% methyl methacrylate. Such polymers are made by free-radical polymerization in a continuous stirred tank reactor to a range of from about 30 to about 65% conversion at temperatures from about 120° to about 200° C., usually contain a mercaptan chain transfer agent, are separated from residual monomer in a devolatilizing extruder, extruded through a die and the extruded strands cut into pellets. Such polymers are the starting materials for the imidization reactions with ammonia or lower alkyl amines. It should be noted that the process for preparing the PMMA is not restricted to the continuous process described above; well-known methods such as bulk casting, suspension polymerization, and emulsion polymerization may also be used. In the multi-polymer blends, the polycarbonate was a commercial bis-phenol A polycarbonate obtained from Mobay Chemical Company, having a melt flow rate of 55–60 grams/10 minutes at 300° C., measured according to ASTM Method D 1238. The poly(p-hydroxystyrene), of 32,000 weight-average molecular weight, was purchased from Hoechst-Celanese, and was reported to have a barrier value against oxygen of 7.88 $cm^3 \cdot mm/(m^2 \cdot atm \cdot day)$.

The poly(ethylene-vinyl alcohol) copolymers and the poly(vinyl alcohol) polymers were commercially available; both are believed to be prepared by the hydrolysis or saponification of the corresponding vinyl acetate co- or homopolymers. For the copolymers used, the molar percentage of ethylene in the copolymer and the melt index, as a correlation with weight-average molecular weight, are given in Table I, below.

TABLE I

| Desig-nation | Vinyl Alcohol Homo- and Copolymers | | | |
|---|---|---|---|---|
| | Polymer Type | Mol % Ethylene | Melt Index | MW |
| CoP-1 | Ethylene-vinyl alcohol | 32 | 1.3 | — |
| CoP-2 | Ethylene-vinyl alcohol | 44 | 5.5 | — |
| CoP-3 | Ethylene-vinyl alcohol | 27 | — | — |
| CoP-4 | Ethylene-vinyl alcohol | 38 | 3.5 | — |
| HP-1 | Poly(vinyl alcohol) | — | — | 14000 |
| HP-2 | Poly(vinyl alcohol) | — | — | 85000 |
| HP-3 | Poly(vinyl alcohol) | — | — | 115000 |
| HP-4 | Poly(vinyl alcohol) | — | — | — |

Melt index was in grams/10 minutes, measured at 190° C. for CoP-1 and CoP-2 and 210° C. for CoP-4.

The commercial designations are: CoP-1: Eval F-101A; CoP-2=Eval E 105A; CoP-3=Eval L (all supplied by Evalco); CoP-4=Soarnol ET, supplied by Nichimen America, Inc. New York, N.Y. (U.S. agents for Nippon Gohsei of Japan); HP-1, HP-2, and HP-3 supplied by Polysciences Inc. Warrington, Pa. 18976; HP-4=Hitech Polyvinyl alcohol containing an unspecified plasticizer, made according to U.S. Pat. No. 4,536,532, and supplied by Hitech Polymers, Inc., P.O. Box 30041, Cincinnati, Ohio 45230.

Blending of polymers: Polymer blends were prepared by tumble-blending pellets, usually with addition of a small amount of thermal stabilizer (0.25 wt. % tris(-nonylphenyl phosphite) based on total resin content). The pellets were fed to a twin-screw, counter-rotating, intermeshing extruder, length 870 mm, equipped with a vacuum vent, a single-hole strand die of approximately 6 mm. diameter, a water bath for cooling the extruded strand, and a strand pelletizer. The feed zone was set at 230° C., and the barrel and die zones at 235° C. The melt temperate was between 226° and 238° C.; a screw speed of 100 rpm was employed.

Alternatively, for smaller samples, blends were prepared from blends of polymer powders and granulated pellets or bulk castings. They were milled on a two-roll electric mill for three minutes at 205°-215° C., then removed from the mill rolls, cooled, granulated and compression molded using a Carver press. The samples were molded at 138 megapascals (MPa) and 215° C. into 127-mm-square plaques 0.13 mm thick.

Preparation of films: A single-screw extruder, 25.4 mm in diameter, 24/1 length/diameter ratio was equipped with a two-stage vacuum vent, a 152.4 mm "coat-hanger" adjustable-thickness film die, a three-roll, heated film stack immediately adjacent to the die lips for receiving the film on extrusion, and a film puller and film wind-up apparatus. The puller speed was set to avoid any drawdown of the film. The extruder was operated at 75 rpm; melt temperatures were usually 232° to 237° C., but may be adjusted depending on recommendations from the resin supplier to achieve acceptable extrusion rates. The roll temperatures of the stack were: top and middle: 132° C., bottom 100° C. Film of thickness 76 to 635 μm were prepared by this method.

Injection Molding: Blended pellets were molded in an injection-molding apparatus equipped with a heated, ASTM family mold. Injection pressures were 5.17 to 7.58 megaPascals (MPA), with back pressure of 0.69 MPa; the melt temperature was 232° to 260° C., depending upon the viscosity of the polymer melt. The mold temperature was 110° C.

Morphology: Polymeric blends were sectioned by microtoming at room temperature to sections about 100 nm thick, and stained with ruthenium tetroxide by the method of Trent et al., Macromolecules, 16, 589 (1983). Exposure to vapors from a 0.5% aqueous solution of $RuO_4$ was about one hour at room temperature. Transmission electron microscopy at a magnification of up to 25000X was carried out on a Zeiss EM-10 instrument.

Oxygen permeability values: Permeability was tested on a Mocon Ox-Tran 1000 unit, manufactured by Modern Controls, Minneapolis, Minn. Films of measured dimensions were mounted in the unit, equilibrated with nitrogen to determine any leakage factor or edge effect, and then exposed to pure oxygen test gas until the carrier gas on the opposite side of the film reached equilibrium. Oxygen was detected by a nickel-cadmium fuel cell known as a Coulox Detector. The unit was equipped to record the oxygen content which was calculated in units of $cm^3.mil/100\ in^2.atm.day$; these units were converted to $cm^3.mm/m^2.atm.day$ by multiplying by 0.3937. The resulting values were compared with values measured or reported for the single component (non-blend) film. Measurements were at 23° C. and 0% relative humidity unless otherwise noted.

EXAMPLE 1

This example illustrates preparation of a blend of a poly(glutarimide) and an ethylene-vinyl alcohol copolymer. The values for the ethylene-vinyl alcohol polymer were from the manufacturer's literature, and were conducted on the dry polymer molding or film unless otherwise noted. Film thickness was approximately 0.178 mm. The properties of the resulting blend are shown in Table II below.

TABLE II

Properties of a Polyglutarimide-Ethylene-Vinyl Alcohol Blend

| Physical Property | Polymer or Blend | | |
|---|---|---|---|
| | Glutarimide[1] | CoP-1[2] | Glutarimide containing 10 wt. percent CoP-1 |
| $O_2$ Perm., 0% RH | 1.0 | >0.002 | 0.055 |
| $O_2$ Perm., 100% RH | 1.0 | 3.7 | 0.16 |
| Tensile Modulus, MPa | 4595 | 3686 | 4134 |
| Glass temperature, °C. | 170[3] | 65 | 169,694 |
| Visual clarity | excellent | poor | good |

[1]N-methylglutarimide, no acid reduction treatment, Vicat 170° C.
[2]see Table describing composition and MW of ethylene-vinyl alcohol copolymers.
[3]from Vicat penetration or softening temperature
[4]two peaks, from differential scanning calorimetry

EXAMPLES 2-6

These examples illustrate the oxygen permeability of glutarimide blends with 10 to 25 weight percent of several polymers containing vinyl alcohol mers. Blends were prepared with the same glutarimide matrix as in Example 1. Values were at 0% relative humidity. The oxygen permeability for the blends at the specified levels of polymers containing the vinyl alcohol mers are shown in Table III below.

TABLE III

Oxygen Permeability of Polyglutarimide Blends

| Example | Vinyl Alcohol (Co)polymer | Level of Copolymer in Glutarimide of Example 1, wt. % | | | | |
|---|---|---|---|---|---|---|
| | | 0% | 10% | 15% | 20% | 25% |
| 1 | CoP-1,Ex. | 4.92 | 0.057 | — | 0.083 | — |
| 2 | CoP-4 | — | <0.3[1] | — | <0.002 | — |
| 3 | HP-1 | — | 1.0 | — | <0.002 | — |
| 4 | HP-2 | — | 0.91 | — | <0.002 | — |
| 5 | HP-3 | — | 1.06 | — | 0.71 | — |
| 6a | HP-4, Lot 1 | — | 0.055 | — | 0.083 | — |
| 6b | HP-4, Lot 2 | — | 0.71 | 0.79 | — | 0.13 |

[1]In separate measurement, <0.005 was value.

EXAMPLE 7

This example illustrates rapid decrease of oxygen permeability at increasing but still low levels of an ethylene-vinyl alcohol copolymer. The polymers and processing were that of Example 1. The predicted values were those read from a line drawn on semi-log paper between the 0 and 100 CoP-1 levels. Film thicknesses were about 0.177 mm. The observed and predicted values for oxygen permeability of the blends are shown in Table IV below.

TABLE IV

Oxygen Permeability of Polyglutarimide-Ethylene-Vinyl Alcohol Blends

| % CoP-1 | Predicted | Found |
|---|---|---|
| 0 | — | 1.22 |
| 1 | 1.18 | 0.81 |
| 2.9 | 1.10 | 0.88 |
| 6.5 | 0.97 | 0.81 |
| 9.1 | 0.88 | 0.34 |
| 11.1 | 0.82 | 0.24 |
| 12.6 | 0.78 | 0.13 |
| 15 | 0.71 | 0.078 |
| 100 | — | 0.033 |

The onset of substantial lessening of oxygen permeability in the present system was seen at about 9 wt. % of the CoP-1 additive, but values below the theoretical were seen at lower concentrations in the blend. Examination of the blends with above 9.1% CoP-1 showed little evidence of a laminar morphology for the dispersed CoP-1 phase.

EXAMPLE 8

This example illustrates rapid decrease of oxygen permeability at increasing but still low levels of a second ethylene-vinyl alcohol copolymer (CoP-3, containing 27 mol-% ethylene). The PMG was that of Example 1. The predicted values were those read from a line drawn on semi-log paper between the 0 and 100 CoP-3 levels. Film thicknesses were about 0.177 mm. The predicted and observed values for oxygen permeability of the blends are shown in Table V below.

TABLE V

Oxygen Permeability of Polyglutarimide-Ethylene-Vinyl Alcohol Blends

| % CoP-3 | Predicted | Found |
| --- | --- | --- |
| 0 | — | 1.22 |
| 3 | 1.15 | 1.32 |
| 6.5 | 0.79 | 1.15 |
| 9 | 0.69 | 0.67* |
| 11 | 0.61 | 0.17* |
| 15 | 0.45 | 0.07 |
| 17.5 | 0.38 | 0.026 |
| 20 | 0.32 | 0.086 |
| 23.6 | 0.25 | 0.0016 |
| 100 | — | 0.0016 |

*From a separate series of experiments.

EXAMPLE 9

This example illustrates rapid decrease of oxygen permeability at increasing but still low levels of a third ethylene-vinyl alcohol copolymer (CoP-2, containing 44 mol-% ethylene). The PMG was that of Example 1. The predicted values were those read from a line drawn on semi-log paper between the 0 and 100 CoP-2 levels. Film thicknesses were about 0.177 mm. The predicted and observed values for oxygen permeability of the blends are shown in Table VI below.

TABLE VI

Oxygen Permeability of Polyglutarimide-Ethylene-Vinyl Alcohol Blends

| | Oxygen Permeability | |
| --- | --- | --- |
| % CoP-2 | Predicted | Found |
| 0 | — | 1.22 |
| 6 | 0.96 | 1.24 |
| 9 | 0.84 | 0.70 |
| 12 | 0.74 | 0.58 |
| 13.4 | 0.70 | 0.43 |
| 14.3 | 0.68 | 0.54 |
| 15 | 0.66 | 0.10 |
| 20 | 0.54 | 0.20 |
| 25 | 0.44 | 0.002 |
| 27.3 | 0.40 | 0.0015 |
| 35 | 0.29 | 0.18 |
| 40 | 0.24 | 0.24 |
| 100 | — | 0.001 |

Microscopic examination of the blend containing 20% of the CoP-2 additive showed a laminar morphology for the dispersed CoP-1 phase.

EXAMPLES 10–26

These examples show the effect of relative humidity on blends of a poly(vinyl alcohol) homopolymer with various glutarimide matrices. The poly(vinyl alcohol) was that used in Example 1 (HP-4). The polyglutarimides were imidized in a devolatilizing extruder to degrees of imidization measured by the Vicat softening temperature of the resulting resin. Portions of these polymers were then reduced in acid content by treatment by the method of Hallden-Abberton et al. The polymers used in the examples are shown in Table VII below.

TABLE VII

Polymers Used in Relative Humidity Effects Study

| Example | Poly(glutarimide) Source | Acid-reduced? | Vicat softening temperature, °C. |
| --- | --- | --- | --- |
| 10 | PMG (from Example 1) | N | 170 |
| 11 | PMG | N | 150 |
| 12 | PMG-T | Y (Ex. 10) | 160 |
| 13 | PMG-T | Y (Ex. 11) | 145 |

Blends of these polymers were then made as in previous examples, with the poly(vinyl alcohol) at 10 and 20% use levels, and oxygen permeability measured at 0 and 100% relative humidities on films of similar thicknesses. The results of these measurements are shown in Table VIII below.

TABLE VIII

Effects of Relative Humidity on Oxygen Permeability of Blends

| Example | Source of Glutarimide | Wt. % PVOH(HP-4) | Relative Humidity | Oxygen Permeability |
| --- | --- | --- | --- | --- |
| 1 | Ex. 10 | — | 0 | 0.98 |
| 1 | Ex. 10 | — | 100 | 0.98 |
| 14 | Ex. 10 | 10 | 0 | 0.71 |
| 15 | Ex. 10 | 10 | 100 | 1.3 |
| 16 | Ex. 11 | — | 0 | 1.2 |
| 17 | Ex. 11 | 10 | 0 | 1.2 |
| 18 | Ex. 11 | 10 | 100 | 1.5 |
| 19 | Ex. 11 | 20 | 0 | 1.1 |
| 20 | Ex. 12 | 10 | 0 | 1.2 |
| 21 | Ex. 12 | 10 | 100 | 1.9 |
| 22 | Ex. 12 | 20 | 0 | 0.002 |
| 23 | Ex. 13 | — | 0 | 2.2 |
| 24 | Ex. 13 | 10 | 0 | 1.5 |
| 25 | Ex. 13 | 10 | 100 | 2.2 |
| 26 | Ex. 13 | 20 | 0 | 0.94 |

These data show that a) high relative humidity is deleterious to permeability behavior, even at the relatively low levels of poly(vinyl alcohol) homopolymer employed, and b) 10% of poly(vinyl alcohol) additive is not enough to produce a drastic decrease in the permeability value.

EXAMPLES 27–36

These examples illustrate that substantial improvements in barrier performance can be achieved by blending relatively low levels of an ethylene-vinyl alcohol copolymer with an acid-reduced poly-N-methylglutarimide. The polyglutarimide was that of Example 12 except for one example where a polymer of lower imide content (Ex. 13) was used; the vinyl alcohol copolymer was CoP-1. The oxygen permeability of the blends is shown in Table IX below.

TABLE IX

Oxygen Permeability of Blends of Acid-Reduced Polyglutarimide with Ethylene-Vinyl Alcohol Polymer

| Example | Source of Glutarimide | Wt. % CoP-1 | Relative Humidity | Oxygen Permeability |
| --- | --- | --- | --- | --- |
| 27 | Ex. 12 | 0 | 0 | 2.42 |
| 28 | Ex. 12 | 3 | 0 | 3.40 |
| 29 | Ex. 12 | 6 | 0 | 2.15 |
| 30 | Ex. 12 | 9 | 0 | 0.721 |
| 31 | Ex. 12 | 10 | 0 | 1.2 |

TABLE IX-continued

Oxygen Permeability of Blends of Acid-Reduced
Polyglutarimide with Ethylene-Vinyl Alcohol Polymer

| Example | Source of Glutarimide | Wt. % CoP-1 | Relative Humidity | Oxygen Permeability |
|---|---|---|---|---|
| 32 | Ex. 13 | 11.1 | 0 | 0.33 |
| 33 | Ex. 12 | 12 | 0 | 0.131* |
| 34 | Ex. 12 | 15 | 0 | 0.0004 |
| 35 | Ex. 12 | 20 | 0 | 0.0004 |
| 36 | Ex. 12 | 25 | 0 | 0.079* |

*sample pelletized poorly and film may not have been uniform.

EXAMPLE 37

This example illustrates that blends of non-imidized poly(methyl methacrylate) will also exhibit unexpectedly good barrier properties when blended with an ethylene-vinyl alcohol copolymer. The polymer used is a poly(methyl methacrylate) homopolymer of molecular weight ca. 150,000. The unmodified PMMA has an oxygen permeability value of 3.9 cm$^3$·mm/m$^2$·atm·day; the value for the blend with 20% CoP-1 was 0.004. The blend had excellent contact clarity and was only slightly hazy.

EXAMPLES 38–40

These examples illustrate that a glutarimide prepared from ammonia does not exhibit the improvement in barrier properties at low levels of blending with a ethylene-vinyl alcohol; copolymer. The ammonia imide had a Vicat temperature of 205° C., was >90% imidized, and about 48% percent of the imide groups were N-methylimide (during imidization with ammonia, monomethylamine is formed, which then competes for the sites of imidization). The samples at 5 and 10% ethylene-vinyl alcohol polymer were hazy; the sample at 20% could not be processed, possibly due to chemical interactions leading to crosslinking. Results of these tests are shown in Table X, below.

TABLE X

Oxygen Permeability of Ammonia Polyglutarimides
Blended with Poly(Ethylene-Vinyl Alcohol)

| Example | Glutarimide | % CoP-1 | Relative Humidity | Oxygen Permeability |
|---|---|---|---|---|
| 38 | Ammonia | — | 0 | ~0.4 |
| 39 | Ammonia | 5 | 0 | 1.3 |
| 40 | Ammonia | 10 | 0 | 1.8 |

EXAMPLE 41

This example illustrates that a styrene copolymer containing imide units does not exhibit outstanding barrier properties. A commercial styrene-maleic anhydride copolymer containing about 20% anhydride by weight was treated with methylamine to yield the N-methylsuccinimide functionality. The permeability value for the polymer was greater than 200. Blending with 20% CoP-1 did not substantially decrease the permeability value.

EXAMPLE 42

This example demonstrates that the blends of glutarimide polymer and ethylene-vinyl alcohol polymer may be further combined with poly(vinyl chloride) and a methacrylate-butadiene-styrene impact modifier to produce a blend with good barrier performance and improved service temperature.

Poly(vinyl chloride) formulations were prepared as follows:

| | |
|---|---|
| Poly(vinyl chloride), K = 69 | 100 parts |
| Organotin stabilizer | 1.0 phr |
| Polyglutarimide, (Ex. 11) | 0 or 40 phr |
| Ethylene-vinyl alcohol copolymer, (CoP-1) | 0 or 4.4 phr |
| MBS modifier | 0 or 24 phr |

The materials were intensively blended while dry, milled for 5 minutes on a two-mill roll at 190° C., and the resulting polymer blend pressed into a film which was 0.2 mm thick. Results of oxygen permeability tests on these materials are shown in Table XI, below.

TABLE XI

Blends of Polyglutarimide-Ethylene Vinyl Alcohol
with Poly(Vinyl Chloride) and MBS

| Glutarimide, phr | CoP-1, phr | MBS, phr | Oxygen Permeability |
|---|---|---|---|
| 0 | 0 | 0 | 3.1 |
| 40 | 0 | 0 | 3.7 |
| 40 | 0 | 24 | 8.23 |
| 40 | 4.4 | 0 | 2.5 |
| 40 | 4.4 | 24 | 3.5 |

EXAMPLES 43–52

These examples illustrate that copolymers of methyl methacrylate with acrylic monomers bearing functional groups, which are expected to improve compatibility with the vinyl alcohol moieties of an ethylene-vinyl alcohol copolymer, exhibit an unexpected improvement in barrier properties. All blends contain 80% methacrylic copolymer and 20% of the ethylene-vinyl alcohol designated CoP-1. Controls with no CoP-1 are noted. The copolymers are prepared by emulsion polymerization, as follows:

Five monomer mixtures were prepared, having respective methyl methacrylate:hydroxyethyl methacrylate ratios of 100:0, 95:5, 90:10, 85:15 and 80:20. Each mixture contained 1320 parts of methyl methacrylate:hydroxyethyl methacrylate monomer, 3.96 parts n-dodecyl mercaptan, 778.24 parts water and 19.8 parts 10% aqueous sodium dodecylbenzene sulfonate solution (a total of 2122 parts).

Each monomer mixture was polymerized according to the following procedure. To an appropriate glass vessel equipped with stirrer, heater, a reflux condenser, and nitrogen sparge tube, was added 1992 parts of deionized water, 59.4 parts of a 10% aqueous solution of sodium dodecylbenzene sulfonate, and 1 part of sodium carbonate. The mixture was sparged for one hour with nitrogen while heating to 70° C. Ten percent of the monomer mixture (212.2 parts) was added at 70° C. and the mixture was heated to 85° C. Then 14.89 parts of a solution of sodium persulfate (2.24 parts) in 146.63 parts of deionized water was added. The reaction was monitored until a color change and exotherm were observed, signalling the onset of polymerization. Sixty minutes after onset, gradual addition of the remainder of the monomer mix was begun and continued over three hours. During that time, the remainder of the initiator solution was added in 14.89part portions every 15 minutes. At the completion of the monomer addition the mixture was held at 85° C. for one hour. The mixture was then cooled, filtered, and the polymer isolated by freeze-drying.

Blends with and without the ethylene-vinyl alcohol copolymer were prepared for testing by milling and compression molding films, and the oxygen permeability was determined as described above. Table XII shows the results for these films.

by sparging with nitrogen and transferred to a poly(vinyl alcohol) bag.

The bag was degassed under mild vacuum. The bag was then heated to 45° C. and held at that temperature for at least 24 hours, then slowly heated to 120° C. and held there for six hours. The poly(vinyl alcohol)-film bag was removed from the resulting polymer, which was then washed with water, dried, and granulated.

In the following blends of Table XIII, the acrylic copolymer was blended with the polycarbonate (a commercial molding grade of bis(phenol-A) polycarbonate) at various ratios, then that blend was blended further with the ethylene-vinyl alcohol copolymer.

The blends were prepared as described above for "Blending of polymers." Extrusion or the alternative milling procedure were used depending upon the amount of polymer made.

TABLE XII

Oxygen Permeability-Copolymers and Binary Blends of MMA/HEMA//CoP-1

| Example | Polymer/Blend | % Composition (w//w) | Calculated Perm.[1] | Observed Perm.[1] |
|---|---|---|---|---|
| 43 | (MMA/HEMA = 100/0) | 100//0 | | 2.96 |
| 44 | (MMA/HEMA = 95/5) | 100//0 | | 2.90 |
| 45 | (MMA/HEMA = 90/10) | 100//0 | | 2.93 |
| 46 | (MMA/HEMA = 85/15) | 100//0 | | 2.67 |
| 47 | (MMA/HEMA = 80/20) | 100//0 | | 2.15 |
| 48 | (MMA/HEMA = 100/0)//CoP-1 | 80//20 | | 8.27[2] |
| 49 | (MMA/HEMA = 95/5)//CoP-1 | 80//20 | 0.77 | 0.39 |
| 50 | (MMA/HEMA = 90/10)//CoP-1 | 80//20 | 0.78 | 0.35 |
| 51 | (MMA/HEMA = 85/15)//CoP-1 | 80//20 | 0.72 | 0.34 |
| 52 | (MMA/HEMA = 80/20)//CoP-1 | 80//20 | 0.61 | 0.37 |

[1]indicates units of $cm^3 \cdot mm/m^2 \cdot atm \cdot day$
[2]This value is anomalously high; compare with Example 37. In no other instance has a value for the methacrylate polymer blend with a vinyl alcohol polymer given a higher value for oxygen permeability than the unmodified control.

EXAMPLES 53–65

These examples illustrate that copolymers of cyclohexyl methacrylate with methyl methacrylate may be blended with another resin plus the ethylene-vinyl alcohol polymer identified herein as CoP-1, to form tough blends having light transmission properties ranging from translucent to transparent.

Samples of the methyl methacrylate/cyclohexyl methacrylate copolymer were prepared as follows: Bags of poly(vinyl alcohol) film were prepared with tightly sealed edges, except for an opening to allow addition of liquids. A monomer mixture of methyl methacrylate (MMA)/cyclohexyl methacrylate (CHMA) was prepared from 2700 parts MMA and 800 parts of CHMA. A separate initiator solution was prepared from 2200 parts MMA, 2.464 parts azobis(isobutyronitrile), 4.928 parts t-butyl peroxyacetate, and 70.4 parts n-dodecyl mercaptan. To the MMA/CHMA mixture was added 517.7 parts of the initiator solution. The resulting monomer-initiator mixture was degassed

TABLE XIII

| Example | Polymer//Blend | % Composition (w/w) | Calculated Perm.* | Observed Perm.* |
|---|---|---|---|---|
| 53 | (MMA/CHMA = 80/20) | 100//0 | | 9.88 |
| 54 | (MMA/CHMA = 80/20)//PC | 75//25 | 18.04 | 15.46 |
| 55 | (MMA/CHMA = 80/20)//PC | 50//50 | 32.84 | 28.99 |
| 56 | (MMA/CHMA = 80/20)//CoP-1 | 76//24 | 1.51 | |
| 57 | (MMA/CHMA = 80/20)//CoP-1 | 54//46 | 0.27 | 0.03 |
| 58 | (MMA/CHMA = 80/20)//CoP-1 | 68//32 | 0.81 | 0.51 |
| 59 | (MMA/CHMA = 80/20)//CoP-1 | 44//56 | 0.12 | 0.03 |
| 60 | (MMA/CHMA = 80/20)//PC-{75//25}//CoP-1 | 81//19 | 3.61 | 0.26 |
| 61 | (MMA/CHMA = 80/20)//PC-{50//50}//CoP-1 | 61//39 | 0.97 | 0.23 |
| 62 | PC//CoP-1 | 28//72 | 0.07 | 0.03 |
| 63 | PC//CoP-1 | 44//56 | 0.33 | 0.04 |
| 64 | PC | 100//0 | | 109.66 |
| 65 | CoP-1 | 100//0 | | 0.004 |

*indicates units of $cm^3 \cdot mm/m^2 \cdot atm \cdot day$

EXAMPLES 66–72

The following examples illustrate that when the level of the third polymer, whose barrier properties are not decreased dramatically by the vinyl alcohol polymer blends, is raised above a critical level of about 25% of the barrier polymer, the advantage of surprising barrier properties of the ternary blend with an acrylic polymer is lost.

TABLE XIV

Oxygen Permeability of Transparent Ternary Blends of (MMA/CHMA = 80//20)/PC//CoP-1

| Example | Polymer/Blend | % Composition (w/w) | Calculated Perm.* | Observed Perm.* |
|---|---|---|---|---|
| 66 | (MMA/CHMA = 80//20)//PC- | 80//20 | 5.41 | 19.6 |

TABLE XIV-continued

Oxygen Permeability of Transparent Ternary Blends of (MMA/CHMA = 80//20)/PC//CoP-1

| Example | Polymer/Blend | % Composition (w/w) | Calculated Perm.* | Observed Perm.* |
|---|---|---|---|---|
| | 50/50)//CoP-1 | | | |
| 67 | (MMA/CHMA = 80//20)//PC-53/47)//CoP-1 | 80//20 | 5.10 | 20.1 |
| 68 | (MMA/CHMA = 80//20)//PC-55/45)//CoP-1 | 80//20 | 4.91 | 16.3 |
| 69 | (MMA/CHMA = 80//20)//PC-57/43)//CoP-1 | 80//20 | 4.73 | 18.0 |
| 70 | (MMA/CHMA = 80//20)//PC-60/40)//CoP-1 | 80//20 | 4.46 | 15.1 |
| 71 | (MMA/CHMA = 80//20)//PC-63/47)//CoP-1 | 80//20 | 4.21 | 15.7 |
| 72 | (MMA/CHMA = 80//20)//PC-65/35)//CoP-1 | 80//20 | 4.05 | 16.9 |

*indicates units of $cm^3 \cdot mm/m^2 \cdot atm \cdot day$.

EXAMPLES 73-76

The following examples illustrate that a blend of poly(p-hydroxystyrene), which is compatible with methyl methacrylate, and which has barrier properties somewhat similar to those of poly(methyl methacrylate), may be used in conjunction with an ethylene-vinyl alcohol copolymer to produce the unexpected improvement in barrier properties. Poly(p-hydroxystyrene) of 32,000 weight-average molecular weight was purchased from Hoechst-Celanese. The barrier value for this material is reported to be 7.88 cm.mm/$m^2$.atm.day.

Three-component blends were prepared as described above for "Blending of polymers." Extrusion or the alternative milling procedure were used depending upon the amount of polymer made. The oxygen permeability of the samples was determined, and is shown in Table XV. The reduction in permeability over expected values is not discernible at low percentages of the ethylene-vinyl alcohol polymer, but it is quite apparent that permeability has been substantially decreased when the level of that copolymer in the blend reaches about 20%.

TABLE XV

Oxygen Permeability of Ternary Blends of PMMA//Poly (p-Hydroxystyrene (PpHS)//Ethylene-Vinyl Alcohol (CoP-1)

| Example | Polymer/Blend | % Composition (w/w) | Calculated Perm.* | Observed Perm.* |
|---|---|---|---|---|
| 73 | PMMA//PpHS//CoP-1 | 89.9/6.7/3.4 | 5.54 | 6.46 |
| 74 | PMMA//PpHS//CoP-1 | 87.0/8.7/4.3 | 5.19 | 7.30 |
| 75 | PMMA//PpHS//CoP-1 | 83.4/8.3/8.3 | 3.84 | 4.37 |
| 76 | PMMA//PpHS//CoP-1 | 54.0/26.0/20.0 | 1.63 | 0.120 |

EXAMPLES 77-88

These examples illustrate blends of the first copolymer containing mers of heterocyclic monomers. Copolymers of these examples were prepared in emulsion using a polymerization procedure similar to that of Example 43. N-vinylpyrrolidone (N-VP), 4-vinylpyridine (4-VP) and p-acetoxystyrene are commercially available monomers. The polymer containing units of p-hydroxystyrene was prepared as follows: In a flask fitted with a reflux condenser and stirrer, 100 g of p-acetoxystyrene copolymer with methyl methacrylate was dissolved in 1000 ml tetrahydrofuran. To this solution was added 25 g sodium hydroxide dissolved in 100 ml water. The mixture was refluxed for two hours, then cooled to 50° C.; 500 ml water was then added, followed by glacial acetic acid until the flask contents were slightly acidic. Water (500-1000 ml) was added to fully precipitate the polymer, which was then filtered and dried under vacuum and blended as in Example 43 with various polymers containing vinyl alcohol units. CoP-5 and CoP-6 are copolymers which are primarily vinyl alcohol having long-chain (up to $C_{20}$) alkenoxy methacrylate ester mers grafted onto the polymer, and were obtained from Air Products Company. CoP-5 has a melt index of 4.5 g/10 minutes, a glass transition temperature ($T_g$) of 46° C., and a melt viscosity of 9408 poise at 19° C. CoP-6 has a melt index of 14 g/10 minutes, a $T_g$ of 24° C., and a melt viscosity of 2970 at 195° C. The melt indices are measured at 230° C. and 2160 g, and the melt viscosities are at zero shear. Most of the polymer blends shown in Table XVI show better resistance to oxygen permeability than predicted by plotting either a linear or an S-shaped curve of the natural logarithm of permeability versus polymer composition, based on the barrier properties of the individual components.

TABLE XVI

Oxygen Permeability of Binary Blends of MMA Copolymers with Polar Monomers//Ethylene-Vinyl Alcohol Copolymer

| Example | Polymer/Blend | % Composition (w/w) | Calculated Perm.* | Observed Perm.* |
|---|---|---|---|---|
| 77 | (MMA/4VP = 90/10)//CoP-1 | 80//20 | 2.27 | 0.131 |
| 78 | (MMA/4VP = 80/20)//CoP-1 | 80//20 | 2.27 | 0.43 |
| 79 | (MMA/NVP = 75/25) | 100//0 | | 3.45 |
| 80 | (MMA/NVP = 75/25)//CoP-1 | 80//20 | 0.89 | 0.019 |
| 81 | (MMA/NVP = 75/25)//CoP-1 | 75//25 | 0.63 | 0.013 |
| 82 | (MMA/NVP = 75/25)//CoP-5 | 80//20 | 0.89 | 0.057 |
| 83 | (MMA/NVP = 75/25)//CoP-5 | 75//25 | 0.63 | 0.056 |
| 84 | (MMA/NVP = 75/25)//CoP-5 | 66//34 | 0.34 | 0.004 |
| 85 | (MMA/NVP = 75/25)//CoP-6 | 80//20 | 0.89 | 0.030 |

TABLE XVI-continued

Oxygen Permeability of Binary Blends of MMA Copolymers with Polar Monomers//Ethylene-Vinyl Alcohol Copolymer

| Example | Polymer/Blend | % Composition (w/w) | Calculated Perm.* | Observed Perm.* |
|---|---|---|---|---|
| 86 | (MMA/NVP = 75/25)//CoP-6 | 75//25 | 0.63 | 0.033 |
| 87 | (MMA/NVP = 75/25)//PVOH | 80//20 | 0.64 | 1.819 |
| 88 | (MMA/NVP = 75/25)//PVOH | 75//25 | 0.64 | 2.226 |

*indicates units of $cm^3 \cdot mm/m^2 \cdot atm \cdot day$.

EXAMPLES 89-100

In the following examples, blends were prepared from CoP-1, N-methyldimethylglutarimide of Vicat softening temperature 170° C. and made without acid reduction treatment, and nylon 6 (poly(carprolactam)) manufactured by Allied-Signal Inc. as Capron 8202. Sodium hydroxide was added at a level of 500 parts per million parts of the total polymer blend to those blends indicated "NaOH-Yes" below. These polymers were blended in a 2.5-cm Killion extruder equipped with a barrier screw operating at 100 rpm and a 4.8-mm die, and having the following temperature profile: feed zone −250° C.; zone 2−300° C.; zone 3−300° C.; die 1−275° C.; die 2−275° C. Blended samples were compression molded into 100-mm square films for permeability testing. The blend compositions and testing results are shown in Table XVII below. Upon visual examination, all samples were transparent and free from haze.

TABLE XVII

Imide-Poly(Vinyl Alcohol)-Polyamide Blends

| Example | Glutarimide % | Nylon 6 % | CoP-1 % | NaOH | Film Thickness, μm | Permeability* | Clarity |
|---|---|---|---|---|---|---|---|
| 89 | 80.75 | 5.0 | 14.25 | No | 307 | 0.705 | Haze-free |
| 90 | 80.75 | 5.0 | 14.25 | No | 279 | 0.669 | Haze-free |
| 91 | 72.25 | 15.0 | 12.75 | No | 376 | 0.657 | Haze-free |
| 92 | 72.25 | 15.0 | 12.75 | No | 269 | 0.677 | Haze-free |
| 93 | 72.25 | 15.0 | 12.75 | Yes | 315 | 0.516 | Haze-free |
| 94 | 63.75 | 25.0 | 11.25 | No | 345 | 0.508 | Haze-free |
| 95 | 63.75 | 25.0 | 11.25 | No | 295 | 0.748 | Haze-free |
| 96 | 63.75 | 25.0 | 11.25 | Yes | 340 | 0.776 | Haze-free |
| 97 | 63.75 | 25.0 | 11.25 | Yes | 325 | 0.929 | Haze-free |
| 98 | 47.5 | 47.5 | 5.0 | Yes | 246 | 1.14 | Haze-free |
| 99 | 45.0 | 45.0 | 10.0 | Yes | 170 | 0.921 | Haze-free |
| 100 | 42.5 | 42.5 | 15.0 | Yes | 216 | 0.638 | Haze-free |

*indicates units of $cm^3 \cdot mm/m^2 \cdot atm \cdot day$.

While the invention has been described with reference to specific examples and applications, other modifications and uses for the invention will be apparent to those skilled in the art without departing from the spirit and scope of the invention defined in the claims below.

We claim:

1. A container having walls suitable for protecting the container contents from environmental gases, the walls being a gas-barrier polymer blend comprising
    a) from about 20 to about 95% by weight of a first polymer containing at least 50 mole percent mers of one or both of lower alkyl (meth)acrylates and glutarimides and forming a continuous phase, and
    b) from about 2.5% to about 40% by weight of a second polymer having at least 50 mole percent vinyl alcohol mers which is either miscible with, or forms a discontinuous phase in, the continuous phase, wherein the permeability to oxygen of the blend is 10% or less of the permeability of the first polymer alone.

2. The container of claim 1 wherein the walls are biaxially oriented.

3. The container of claim 1 wherein the walls are a laminar structure having layers of one or more additional polymers.

4. The container of claim 1 having a closure.

5. The container of claim 1 in the form of a bottle.

* * * * *

UNITED STATES PATENT AND TRADEMARK OFFICE
CERTIFICATE OF CORRECTION

PATENT NO. : 5,208,083
DATED : May 4, 1993
INVENTOR(S) : William T. Freed

It is certified that error appears in the above-identified patent and that said Letters Patent is hereby corrected as shown below:

On the title page, item [75], insert the following inventors--William J. Work, Huntingdon Valley, PA; William G. Carson, Moorestown, NJ; Edward E. LaFleur, Warminster, PA; and Robert M. Amici, Doylestown, PA.

Signed and Sealed this

Nineteenth Day of April, 1994

*Attest:*

BRUCE LEHMAN

*Attesting Officer*     *Commissioner of Patents and Trademarks*